(12) United States Patent
Sherman et al.

(10) Patent No.: US 6,431,763 B1
(45) Date of Patent: Aug. 13, 2002

(54) CONNECTOR FOR PLASTIC OPTICAL FIBERS

(75) Inventors: Charles J. Sherman, Westminster, CO (US); George John Shevchuk, Old Bridge, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/548,951

(22) Filed: Apr. 13, 2000

(51) Int. Cl.⁷ .................................................. G02B 6/36
(52) U.S. Cl. ............................. 385/81; 385/62; 385/78
(58) Field of Search ............................ 385/53, 55, 56, 385/58, 60, 62, 69, 70, 72, 76–78, 81, 84, 86, 87

(56) References Cited

U.S. PATENT DOCUMENTS 3,637,284 A * 1/1972 Plyler ........................... 385/81
4,134,641 A * 1/1979 Kao et al. ...................... 385/70
4,274,708 A * 6/1981 Cocito et al. ............. 385/55 X
4,415,232 A * 11/1983 Caron .......................... 385/84
4,418,983 A * 12/1983 Bowen et al. ................. 385/69
4,986,625 A * 1/1991 Yamada et al. ............... 385/55
5,742,719 A * 4/1998 Birnbaum .................... 385/70

* cited by examiner

*Primary Examiner*—John D. Lee
(74) *Attorney, Agent, or Firm*—Cohen, Pontani Lieberman & Pavane

(57) ABSTRACT

An optical connector assembly includes a connector body having an inner wall defining a bore extending longitudinally through the connector body and shaped to receive an optical fiber. A fiber-retaining mechanism is disposed in the connector body for retention of the optical fiber received in the bore by frictionally engaging an outer circumferential surface of the optical fiber to thereby restrain unintended longitudinal displacement of the optical fiber relative to the bore.

5 Claims, 5 Drawing Sheets

CONNECTOR FOR PLASTIC OPTICAL FIBERS

BACKGROUND OF THE INVENTION

1. Field of the Invention

The present invention relates to optical fiber connectors and, more particularly, to an optical fiber connector having a fiber retaining mechanism.

2. Description of the Related Art

Increasingly, telecommunication systems employ optical fibers for signal transmission. Optical fibers require a multitude of interconnection components including optical fiber connectors for connecting fibers to active devices such as transmitters, receivers, detectors, amplifiers, and repeaters, etc.

An optical fiber connector optically aligns a central core of an optical fiber with a receiving end of a device so as to ensure maximum transmission of optical signals between the fiber and the device. Achieving this alignment is particularly challenging in the case of glass optical fibers since the core of a typical such fiber is generally quite small—about 8 µm in diameter for single mode fibers. Another function of an optical fiber connector is to provide mechanical stability and protection of the optical connection in a user environment.

A prior art connector comprises a cylindrical ferrule, a base member for holding the ferrule, a compression spring, and a housing dimensioned to surround the ferrule and the spring. The fiber is held rigidly in the ferrule by an adhesive, and the compression spring applies an axial force to the ferrule and fiber so that the end face of the fiber is maintained in contact with the mating fiber of another connector. In the case where the fiber is to be connected to an optical device, the compression spring positions the ferrule and thus the end face of the fiber at a predetermined axial distance from the device. Although this prior art connector adequately performs its intended functions, the requisite ferrule increases the complexity of its design and assembly procedure.

Thus, there is a continuing need for an optical connector that is inexpensive to manufacture and easy to assemble.

SUMMARY OF THE INVENTION

An object of the present invention is to provide a low-cost, simple-to-use optical connector body (plug or socket) having a retaining mechanism for securing an optical fiber therewithin.

According to one aspect of the present invention, the retaining mechanism includes at least one spring clip for clamping or gripping the optical fiber. The spring clip may include a sharp edge for engaging an outer protective jacket of the optical fiber.

According to another aspect of the present invention, the retaining mechanism includes a movable locking member having a gripping portion for gripping or frictionally engaging an outer protective jacket of an optical fiber and a flexible finger extending from the gripping portion to a cavity defined by an inside wall of the connector body. The movable locking member is guided for movement between an engaged position and a non-engaged position along an axial direction of the optical fiber. The locking member is positioned in the connector body such that the flexible finger is deflected in a lateral direction when the locking member is in the engaged position and deflected in the opposite lateral direction when the locking member is in the non-engaged position. Due to this deflection of the flexible finger, the locking member rests in either the engaged or non-engaged positions and resists displacement from either position.

According to still another aspect of the present invention, the retaining mechanism includes a cam-lever member having a cam portion at one end and a lever at another end. The cam portion has a tooth-like surface for gripping an outer protective jacket of the optical fiber. The lever is shaped so as to be manipulatable by a user. The cam-lever member is actuated by pivoting the cam portion about a fulcrum block so as to lodge the cam portion between the outer protective jacket of the optical fiber and the fulcrum block. At this engaged position, the toothlike surface of the cam portion firmly secures the outer protective jacket of the optical fiber to thereby prevent unintended relative movement therebetween.

In one embodiment, an optical connector assembly includes a connector body having an inner wall defining a bore extending longitudinally through the connector body and shaped to receive an optical fiber. The optical connector assembly further includes a fiber retaining mechanism, disposed in the connector body, for retention of the optical fiber received in the bore by frictionally engaging a circumferential surface of the optical fiber to thereby restrain displacement of the optical fiber relative to the bore. The spring-like retention mechanism comprises a spring clip having a fiber-engaging end for frictional engagement with an outer surface of the optical fiber. The spring clip is configured for applying a predetermined spring force against the circumferential surface of the optical fiber.

In another embodiment, the retention mechanism includes a movable gripping member having a gripping portion slidably guided for movement along the longitudinal direction of the bore. The gripping portion has an engagement surface for frictional or gripping engagement with the outer jacket of an optical fiber and is movable between a non-engaged position at which the engagement surface is not in contact with the outer jacket of the optical fiber, and an engaged position at which the engagement surface is in contact with the outer jacket of the optical fiber.

In still another embodiment, the retention mechanism includes a fulcrum block disposed adjacent the fiber-receiving bore and a cam-lever member having a cam portion and a user-manipulatable lever. The cam portion has an engagement surface for frictional engagement with the outer jacket of the optical fiber and a cam surface for rolling engagement with the fulcrum block so as to guide the engagement surface of the cam portion to frictionally engage the outer jacket of the optical fiber.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements.

DETAILED DESCRIPTION OF THE CURRENTLY PREFERRED EMBODIMENTS

Figure 1A:
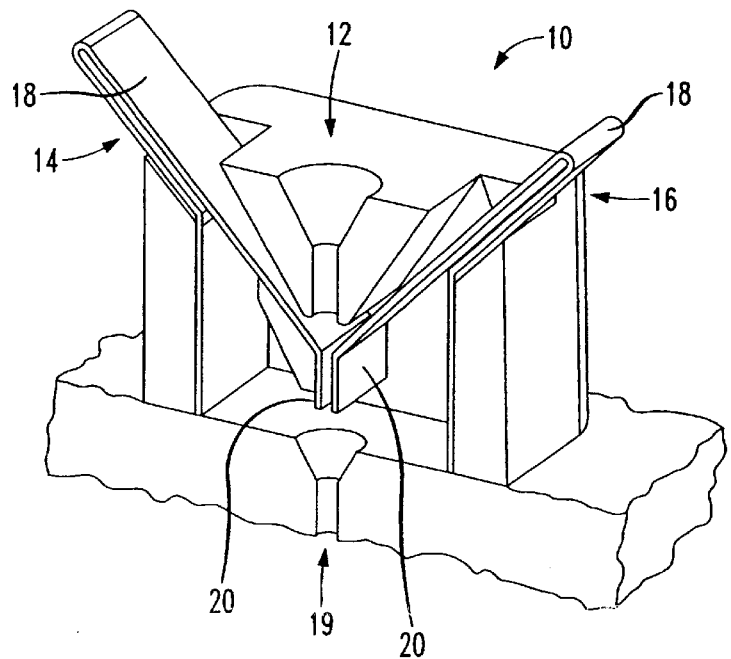
FIG. 1A is a sectional view of a connector body having a pair of spring clips in accordance with a first embodiment of the present invention.
Figure 1B:
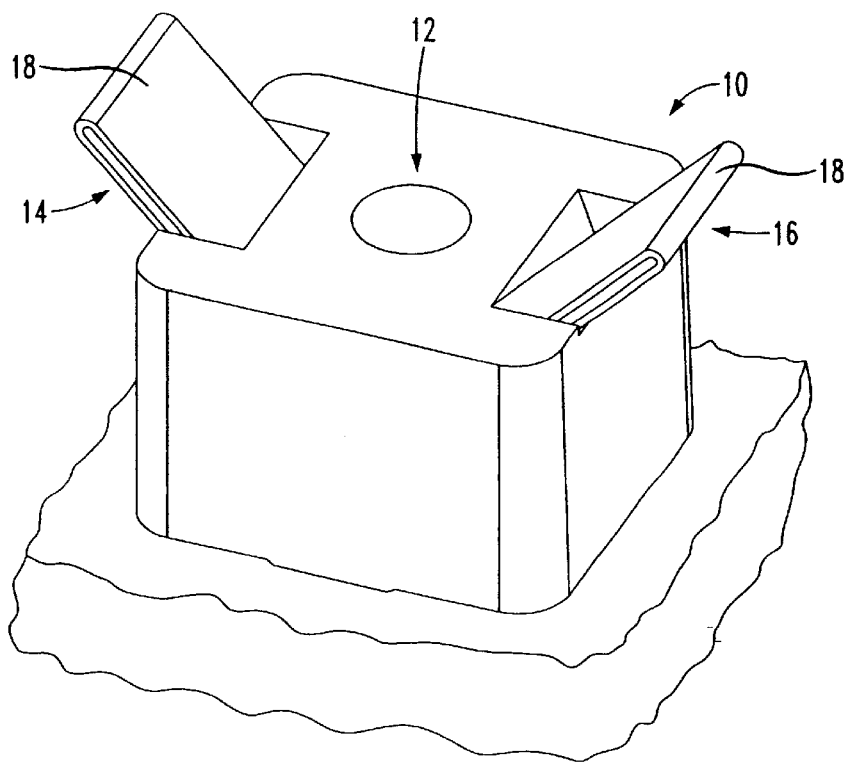
FIG. 1B is a perspective view of the connector body of FIG. 1.

FIGS. 1A and 1B illustrate a connector body 10 constructed in accordance with a first embodiment of the present invention. The connector body 10, which may form a portion of a plug or a socket, includes a bore 12 for receiving a jacketed or bare optical fiber (not shown), and a fiber-retaining mechanism comprising first and second spring clips 14, 16 resiliently mounted to connector body 10. Each of the first and second spring clips 14, 16 has a user manipulatable end 18 and a fiber-engaging end 20 shaped to press against an outer surface of the optical fiber. The first and second spring clips 14, 16 preferably extend at an angle with respect to the optical fiber so as to frictionally clamp the optical fiber between the fiber-engaging ends 20 of the first and second spring clips with a predetermined spring force. Preferably, the spring clips 14, 16 exert increasing clamping force on the fiber when reverse forces are applied to withdraw the optical fiber 24 from the alignment bore 19. The first and second spring clips 14, 16 may be formed of, for example, beryllium copper or phosphor bronze.

Figure 1C:
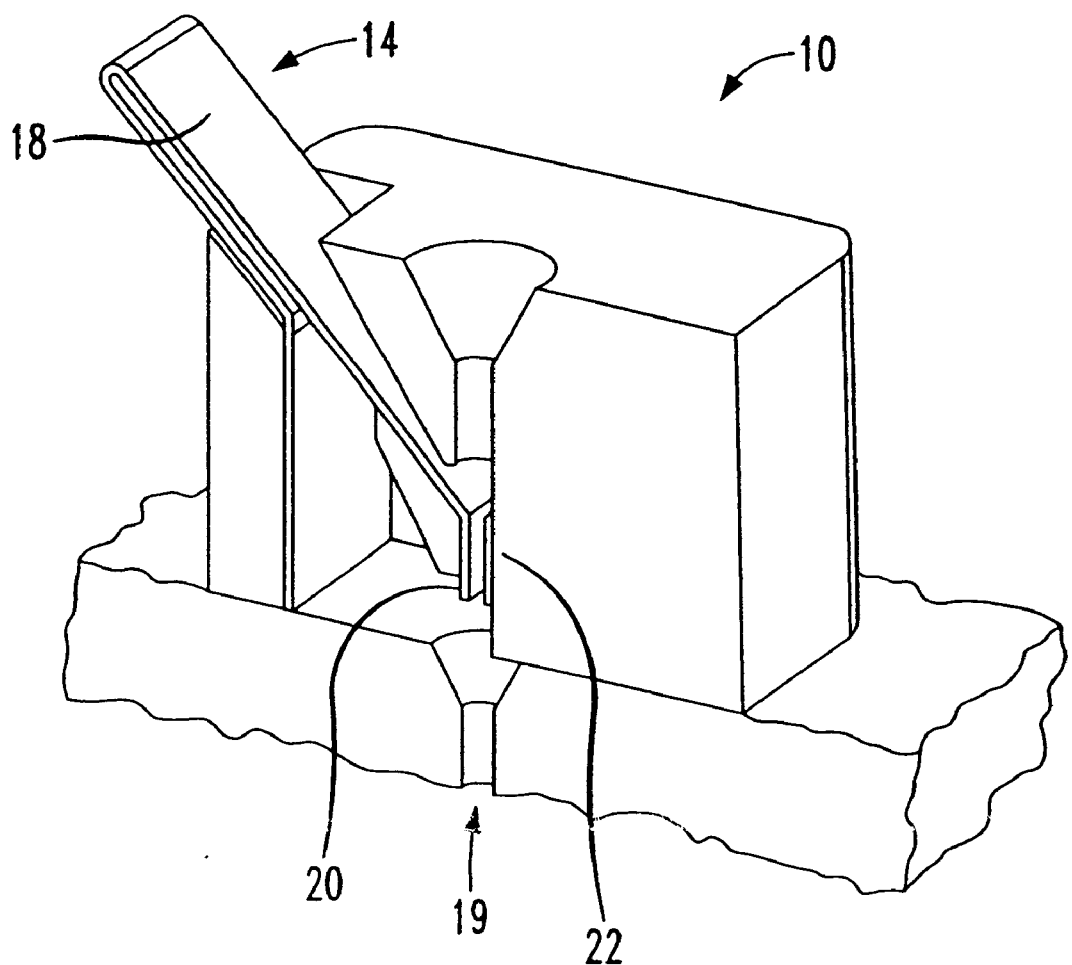
FIG. 1C is a sectional view of a connector body having only a single spring clip in accordance with a variation of the embodiment of FIG. 1A.

Instead of two spring clips, the fiber-retaining mechanism may employ a fiber supporting surface 22 and only one spring clip 14, as for example shown in FIG. 1C. In this modified form, the fiber-engaging end 20 of spring clip 14 presses or frictionally clamps the optical fiber against a fixed fiber-supporting surface 22 with a predetermined spring force.

Figure 1D:
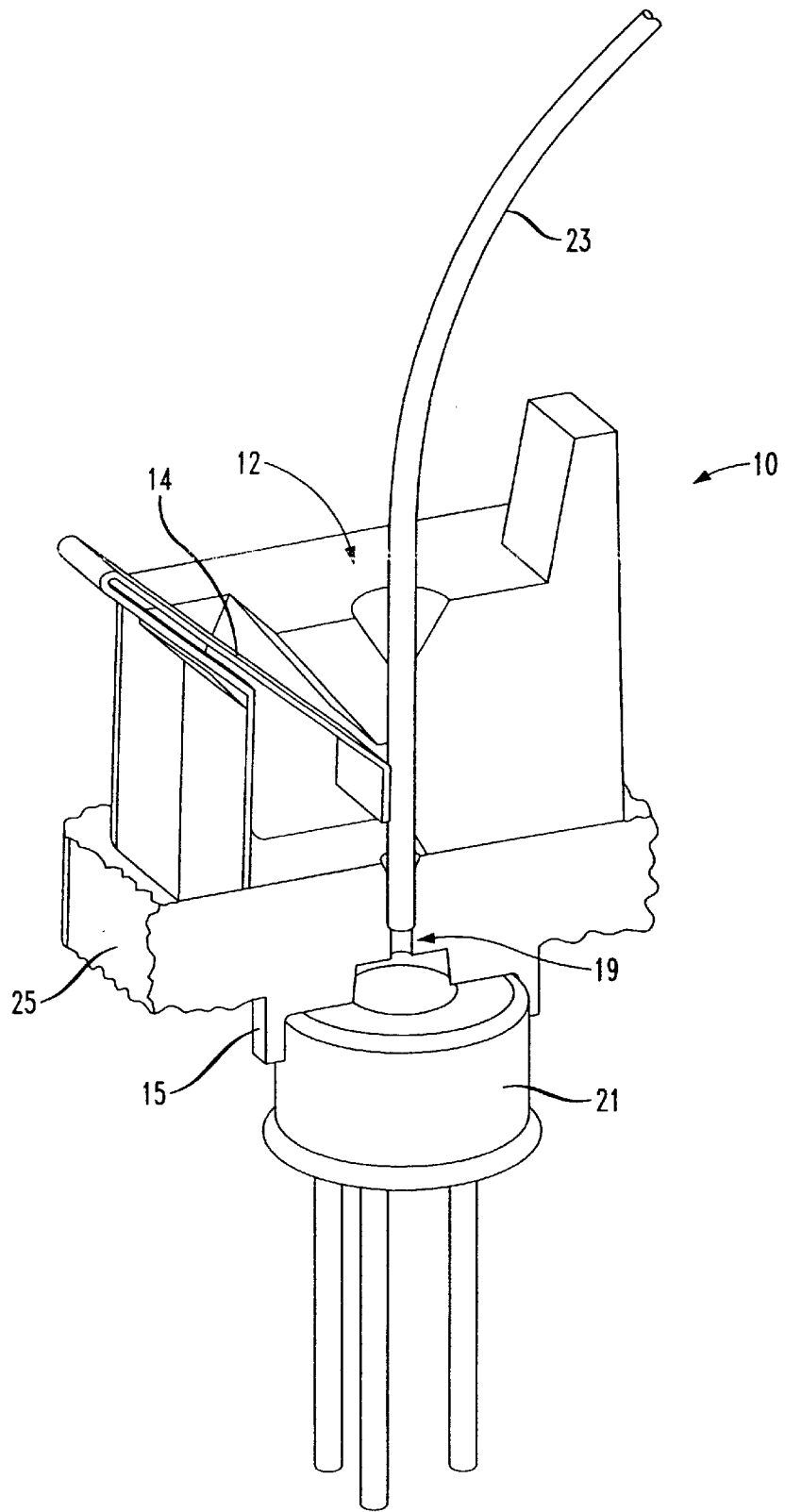
FIG. 1D is a sectional view of the embodiment of FIG. 1C in combination with an optical device.

FIG. 1D shows the connector body 10 of FIG. 1C configured to optically connect a bare optical fiber 23 with an optical device 21 such as an optical detector or transmitter. The bare optical fiber is slidably received in bore 12 and frictionally held to the connector body 10 by spring 14. Preferably, a fiber end of the optical fiber is received and positioned in an alignment bore 19 formed in the housing 25 of, for example, an optical transceiver for alignment with the optical device 21. The optical device 21 is positioned and/or releasably captured by a circumferential wall 15 for optical communication with the fiber end of the bare optical fiber 23.

Manipulation of the user-manipulatable end 18 of spring clips 14 and/or 16 permits the optical fiber to be selectively inserted or released from the connector body 10.

The connector body 10 may be attached to the housing 25 of the optical device by, for example, adhesive or any releasable retaining mechanism.

Figure 2:
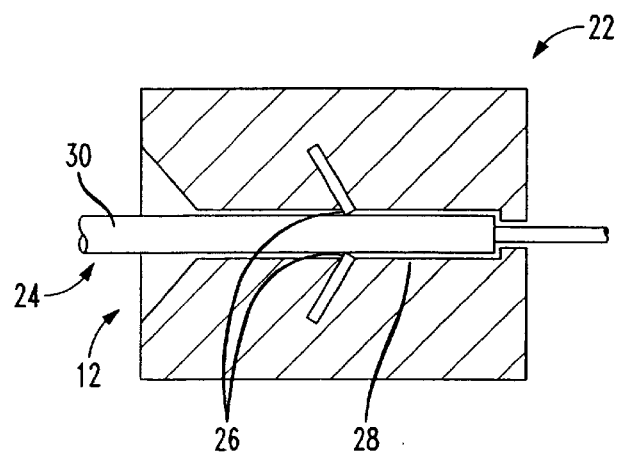
FIG. 2 is a sectional view of a connector body having metallic strips with sharp edges in accordance with a second embodiment of the present invention.

FIG. 2 is a sectional view of a second embodiment of an inventive connector body 22 for use with a jacketed optical fiber 24. The fiber-retaining mechanism includes a sharp edge 26 extending a preselected distance from an inner wall 28 of the bore 12 for firmly securing and retaining the optical fiber 24 received within the bore 12. In a particularly preferred embodiment, the sharp edge 26 is formed by a fiber-engaging end of a metallic strip embedded in the connector body 22 and disposed at a suitable angle relative to the longitudinal axis of the optical fiber 24. Preferably, the metallic strip is spring loaded so that the sharp edge 26 is urged into gripping engagement with the outer jacket 30 of optical fiber 24. So arranged, the optical fiber 24 flexes the sharp edge 26 away as the optical fiber 24 is longitudinally inserted into the bore 12; yet, when reverse forces are applied to withdraw the optical fiber 24 from the bore 12, the sharp edge 26 deflects radially inward toward the optical fiber and thereby traps or locks the optical fiber 24 in the bore 12. It is contemplated that the connector body 22 be integrally molded and that the sharp edge 26 be formed as a circumferential protrusion projecting from the inner wall 28. The edge 26 can also be unitarily formed or molded with the inner wall 28 to provide a simplified structure and reduce manufacturing and assembly costs.

Figure 3:
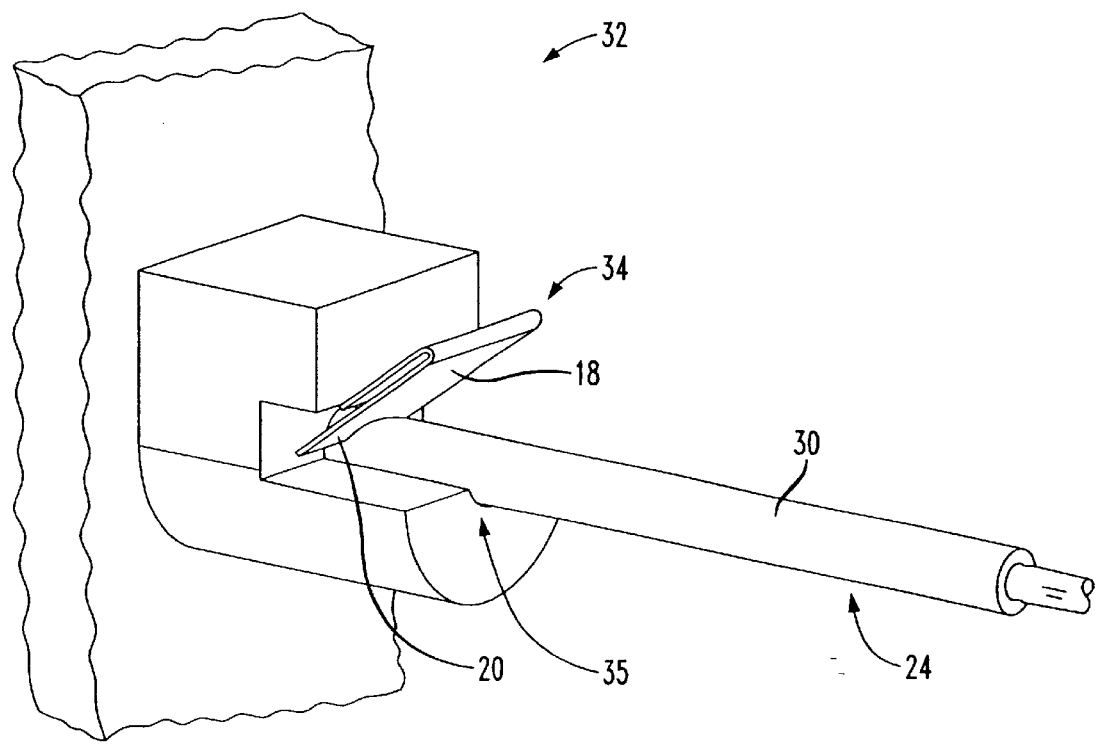
FIG. 3 is a perspective view of a connector body having only a single spring clip in accordance with a variation of the embodiment of FIG. 2.

FIG. 3 illustrates an alternative variation of the embodiment of FIG. 2. The fiber retaining mechanism includes a spring clip 34 resiliently mounted to the connector body 32 and a fiber-supporting surface 35. As shown, the spring clip 34 has a user-manipulatable end 18 and a fiber-engaging end 20 disposed adjacent to the fiber-receiving bore 12 of connector body 32 and configured to apply a clamping force on a jacketed optical fiber 24 against the fiber-supporting surface 22. The fiber-engaging end 20 of spring clip 34 is preferably provided with a sharp edge 26 so that it may firmly secure the outer jacket of the optical fiber 24 to the connector body 32. The optical fiber 24 may be withdrawn from the connector body 32 by manipulating the end 18 of the spring clip 34. Embodiments of the spring clip in which the clip includes additional structure—or is mounted for cooperation with otherwise provided structure—for limiting the permitted penetration of the sharp edge into the optical fiber are also within the intended scope and contemplation of the invention.

Figure 4:
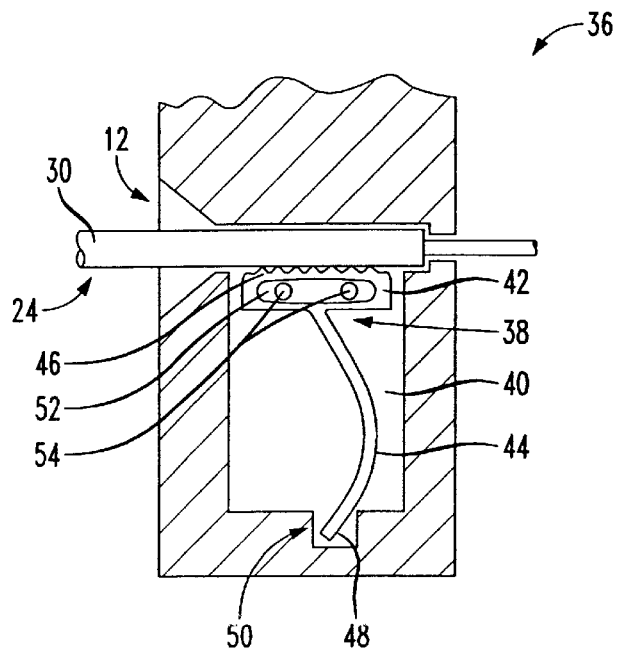
FIG. 4 is a sectional view of a connector body having a movable locking member in accordance with a third embodiment of the present invention.

FIG. 4 depicts a third embodiment of an inventive connector body 36. The fiber retaining mechanism in this third embodiment includes a movable locking member 38 housed in a chamber 40 defined in the connector body 36 and movable along the longitudinal axis of an optical fiber 24 received in the connector body 36. The locking member 38 includes a gripping portion 42 and, preferably, a flexible finger 44. The gripping portion 42 has an engagement surface 46 for frictional engagement with the outer jacket 30 of optical fiber 24. A distal end 48 of the flexible finger 44 is preferably captured or otherwise prevented from free or unrestrained movement by, for example, a cavity 50 defined in the connector body 36 and dimensioned to confine the distal end 48 of the finger 44. To facilitate movement of the gripping portion 42 relative to the connector body 36, the gripping portion 42 preferably has a groove or hole 52 shaped to slidably receive one or more guide members 54 projecting from an inner wall of the connector body 36. The distance between the cavity 50 and guide member(s) 54 and the length of finger 44 are such that the finger 44 is deflected in both the engaged and the non-engaged positions of the locking member 38. So arranged, the movable locking member 38 is bi-modal in the sense that it may rest in either the engaged or non-engaged position. For example, in the engaged position the finger 44 deflects in one lateral direction, and at the non-engaged position, the finger 44 deflects in the opposite lateral direction. In both these positions, the flexible finger 44 is stressed so as to impart a force biasing the optical fiber 24 toward that position. In use, the locking member 38 is actuated as the optical fiber 24 is inserted into the fiber-receiving bore 12 of the connector body 36. As the fiber 24 is displaced further into the bore 12, the locking member 38 engages the outer jacket 30 of the fiber 24 and the flexible finger 44 snaps into its engaged position.

Figure 5:
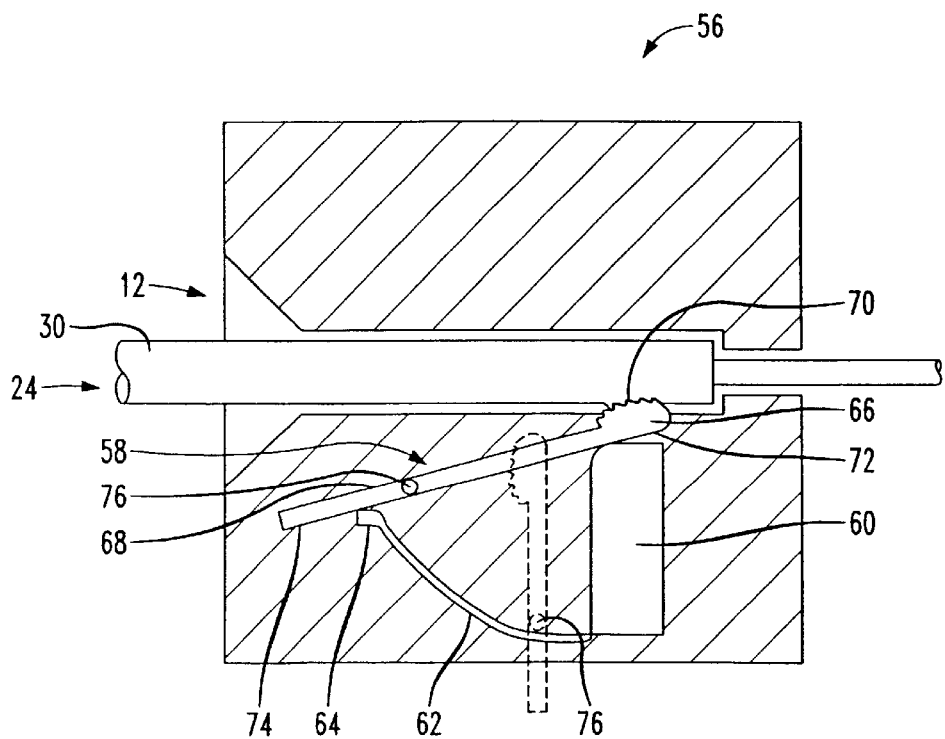
FIG. 5 is a sectional view of a connector body having a cam-lever member in accordance with a fourth embodiment of the present invention.

FIG. 5 illustrates a fourth embodiment of a connector body 56. The retaining mechanism of this embodiment includes a movable cam-lever member 58, a fulcrum block 60, a guide 62, and a snap shelf 64. The cam-lever member 58 has a cam portion 66 and a lever 68 dimensioned for manipulation by a user. The cam portion 66 has an engagement surface 70 (e.g., a tooth-like surface) for gripping the outer jacket 30 of the optical fiber 24 and a cam surface 72 shaped to pivot about a corner of the fulcrum block 60 so as to lodge the cam portion 66 between fulcrum block 60 and optical fiber 24 and thereby engage the engagement surface 70 of cam portion 66 with the outer jacket 30 of the optical fiber 24. At this engaged position, a distal end 74 of the lever 68 may be placed against the snap shelf 64 to prevent lever 68 from pivoting in a reverse direction to dislodge cam portion 66. To guide the cam-lever member 58 from an initial non-engaged position (as illustrated by the dashed lines in FIG. 5) to an engaged position (as illustrated by the solid lines in FIG. 5), there is provided a guide 62 extending between snap shelf 64 and fulcrum block 60. Preferably, the cam-lever member 58 has a lateral projection 76 complementarily shaped to slide along the guide 62 as the cam-lever member 58 moves from the non-engaged position to its engaged position. The cam-lever member 54 may be molded as an integral portion of the connector body 56 and attached to the connector body 56 through a frangible portion. Thus, during assembly, the user will be required to break the frangible portion prior to moving the cam-lever member 54.

It is contemplated that all of the embodiments of the inventive connector body described herein may be unitarily constructed as, for example, by injection molding. It is further contemplated that the inventive connector body be most advantageously used with plastic optical fibers (POFs) as these fibers have larger light-transmitting cores than those of glass optical fibers (GOFs), thereby alleviating the need for high-precision optical alignment. Since POFs offer larger circumferential surfaces for frictional gripping, and are less fragile than GOFs, bare fibers can be used. It is nevertheless recognized and intended that the inventive arrangements may also be used to like advantage with glass optical fibers, and it is not intended that the invention be limited to use with optical fibers formed of any particular material.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An optical connector assembly, comprising:
   a connector body having an inner wall defining a bore extending longitudinally through said connector body and shaded to receive an optical fiber;
   a fiber-retaining mechanism, disposed in the connector body, for retention of the optical fiber receive in said bore by frictionally engaging an outer circumferential surface of the optical fiber to thereby restrain displacement of the optical fiber relative to said bore, wherein said fiber-retaining mechanism includes a movable gripping member having a gripping portion slidably guided for movement along the longitudinal direction of said bore, said gripping portion having an engagement surface for frictional engagement with an outer jacket of the optical fiber, and said gripping portion being movable between a non-engaged position at which the engagement surface is disposed in non-contacting spaced relation to the outer jacket of the optical fiber, and an engaged position at which the engagement surface is disposed in frictional engagement with the outer jacket of the optical fiber.

2. The optical connector assembly of claim 1, wherein said retention mechanism further includes a cavity defined in the connector body and a flexible finger extending from said gripping portion to said cavity, said flexible finger being dimensioned such that when said movable gripping member is at the engaged position the flexible finger is deflected in one lateral direction and when said movable gripping member is deflected at the non-engaged position the deflected finger is deflected in an opposite lateral direction.

3. An optical connector assembly, comprising:
   a connector body having an inner wall defining a bore extending longitudinally through said connector body and shaped to receive an optical fiber;
   a fiber-retaining mechanism, disposed in the connector body, for retention of the optical fiber received in said bore by frictionally engaging an outer circumferential surface of the optical fiber to thereby restrain displacement of the optical fiber relative to said bore, wherein said fiber-retaining mechanism includes a fulcrum block disposed adjacent said bore and a cam-lever member having a cam portion and a lever, said cam portion having an engagement surface for frictional engagement with an outer jacket of the optical fiber and a cam surface for rolling engagement with said fulcrum block so as to guide said engagement surface of said cam portion to frictionally engage the outer jacket of the optical fiber in response to user-manipulation of said lever.

4. The optical connector assembly of claim 3, wherein said fiber-retaining mechanism further includes a snap shelf and a guide extending from said fulcrum block to said snap shelf for slidably guiding said lever of said cam-lever member for movement between a non-engaged position at which the engagement surface of said cam portion is disposed in non-contact relation with the outer jacket of the optical fiber, and an engaged position at which the engagement surface of said cam portion is frictionally engaged with the outer jacket of the optical fiber, said snap shelf being positioned such that an end of said lever is restable on said snap shelf after the cam-lever member is moved to its engaged position.

5. The optical connector assembly of claim 4, wherein said lever includes a lateral protrusion complementarily shaped to slide along said guide.

* * * * *